(12) United States Patent
So et al.

(10) Patent No.: US 8,605,693 B2
(45) Date of Patent: Dec. 10, 2013

(54) APPARATUS AND METHOD FOR LOW POWER LOCAL AREA COMMUNICATION USING EVENT SIGNAL CONTROL

(75) Inventors: Won Wook So, Gyunggi-do (KR); Jong Heum Park, Gyunggi-do (KR); Young Kyu Park, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 885 days.

(21) Appl. No.: 12/716,970

(22) Filed: Mar. 3, 2010

(65) Prior Publication Data

US 2011/0164595 A1    Jul. 7, 2011

(30) Foreign Application Priority Data

Jan. 5, 2010  (KR) .................. 10-2010-0000456

(51) Int. Cl.
*H04W 4/00* (2009.01)
*H04L 12/66* (2006.01)
*G06F 3/00* (2006.01)
*G01S 13/00* (2006.01)

(52) U.S. Cl.
USPC ........... 370/338; 370/352; 370/351; 370/356; 370/328; 455/69; 455/424; 455/567; 710/3

(58) Field of Classification Search
USPC .................................. 370/328–356
See application file for complete search history.

(56) References Cited

U.S. PATENT DOCUMENTS

| | | | |
|---|---|---|---|
| 7,260,375 B2 * | 8/2007 | Ash ............................... 455/260 |
| 7,295,638 B2 * | 11/2007 | Martin et al. .................. 375/348 |
| 7,450,062 B2 * | 11/2008 | McBurney et al. ........ 342/357.4 |
| 7,561,881 B2 * | 7/2009 | Feher ............................ 455/440 |
| 7,822,097 B2 * | 10/2010 | Ryckaert ...................... 375/130 |
| 7,848,746 B2 * | 12/2010 | Juels ............................. 455/424 |
| 7,996,571 B2 * | 8/2011 | Salokannel ....................... 710/3 |
| 8,045,922 B2 * | 10/2011 | Sherman et al. ............. 455/41.2 |
| 8,150,421 B2 * | 4/2012 | Ward et al. ................. 455/456.5 |
| 2004/0087297 A1 * | 5/2004 | Ash ............................... 455/290 |
| 2005/0195105 A1 * | 9/2005 | McBurney et al. ........ 342/357.1 |
| 2006/0039448 A1 * | 2/2006 | Ryckaert ...................... 375/130 |
| 2007/0032246 A1 * | 2/2007 | Feher ......................... 455/456.1 |
| 2007/0186105 A1 * | 8/2007 | Bailey et al. .................. 713/168 |
| 2008/0143591 A1 * | 6/2008 | McBurney et al. ........ 342/357.1 |
| 2009/0002225 A1 * | 1/2009 | McBurney et al. ........ 342/357.1 |
| 2009/0232063 A1 * | 9/2009 | Cordeiro et al. .............. 370/329 |
| 2011/0164595 A1 * | 7/2011 | So et al. ....................... 370/338 |

\* cited by examiner

*Primary Examiner* — Ayaz Sheikh
*Assistant Examiner* — Venkatesh Haliyur
(74) *Attorney, Agent, or Firm* — Blakely Sokoloff Taylor & Zafman LLP

(57) ABSTRACT

Disclosed herein is an apparatus and method for low power local area communication using event signal control. The low power local area communication apparatus includes at least one coordinator and a plurality of network device. The network coordinator transmits a periodic beacon signal based on the preset beacon period of a superframe and a continuous RF event signal, receives a first signal including a Service Set Identifier (SSID) and a second signal including the SSID and an event detection code, and performs the transmission or reception of data when authentication has been completed. Each of the network devices generates and transmits the first and second signals, performs the transmission and reception of data after authentication has been completed, and is thereafter switched to power saving mode or OFF mode. Accordingly, the construction of the system is simplified, and the cost of the system is reduced.

9 Claims, 5 Drawing Sheets

APPARATUS AND METHOD FOR LOW POWER LOCAL AREA COMMUNICATION USING EVENT SIGNAL CONTROL

CROSS REFERENCE TO RELATED APPLICATION

This application claims the benefit of Korean Patent Application No. 10-2010-0000456, filed on Jan. 5, 2010, entitled "Apparatus and Method for Low Power Local Area Communication Using Event Signal Control," which is hereby incorporated by reference in its entirety into this application.

BACKGROUND OF THE INVENTION

1. Technical Field

The present invention relates to an apparatus and method for low power local area communication using event signal control.

2. Description of the Related Art

ZigBee, one of Wireless Personal Area Network (WPAN) technologies, is a personal wireless network standard which is characterized by low power, low cost, and low data rate and which is required for 2.4 GHz-based home automation and data. Such ZigBee has been standardized in IEEE 802.15.4.

With reference to the standard, ZigBee uses 2.40 GHz, 915 MHz, and 868 MHZ frequency bands, and may have 250 kbps (16 channels in the 2.4 GHz Industrial, Scientific and Medical (ISM) bands) and 40 kbps/20 kbps (10 channels in the 915 MHz band/1 channel in the 868 MHz band) transmission rates for respective frequencies. The modem type of ZigBee is Direct Secure Spread Spectrum (DSSS), which enables data to be transmitted at 20 to 250 kbps data rates in a 30 m radius, and enables 255 devices to be connected to a single wireless network at most, so that a large-scale indoor/outdoor wireless sensor network can be constructed.

Compared with another WPAN technology such as Bluetooth or Ultra Wide Band (UWB) communication, ZigBee enables ultra-low power consumption to be realized and the construction of a wireless transmission/reception circuit to be simplified, so that there is an advantage in that the cheapest chipset price can be realized. ZigBee is a short range wireless communication technology which is competitive in the area of vertical applications such as a sensor network.

Such ZigBee has been utilized in various applications such as access control, location tracking, logistics management, and building management. For example, if ZigBee is introduced into lighting, fire sensing, air-conditioning and heating systems in a building, a building manager can remotely manage and control the building system using a portable device without staying in the janitor's office.

WPAN based on such ZigBee technology may include a single network coordinator and a plurality of network devices each of which is connected to the network coordinator and which transmits and receives data.

In the construction of such WPAN, the network coordinator is included in a computer or the main control device of a home network, and is configured to control data transmission and reception to and from the plurality of network devices. The network devices are parts for actually inputting and outputting data, and, in the case of home automation, may correspond to a heating system, a ventilation system, an air conditioner, a security system, a light, and a sensor.

In order to realize low-power characteristics in ZigBee, the network devices are operated in the state in which the receivers thereof are turned off for most of the time except for time required for synchronization.

In this case, the network coordinator transmits superframe beacons at predetermined time intervals. Here, the intervals between beacon signals may range from a minimum of 15 msec to a maximum of 245 msec. In order to reduce power consumption, each of the network devices is operated in the state in which it is turned off, aside from the case in which it receives periodic beacon signals.

Therefore, when a single coordinator simultaneously broadcasts packets to a plurality of network devices, there is a problem in that network devices which are turned off cannot completely receive the packets which have been broadcasted.

In order to solve the problem, a method of allowing a ZigBee system and a Radio-Frequency Identification (RFID) system to be installed together in a single module and to operate in conjunction with each other has recently been proposed.

In conventional ZigBee systems, a ZigBee system using an RFID is constructed in such a way that a network coordinator further includes an RFID reader and each of network devices includes an RFID tag. The system presents a method of enabling data transmission and reception between the network coordinator and the network device in such a way that the RFID reader transmits a signal to the RFID tag of the network device, and that the RFID tag transmits a wake-up signal to the ZigBee system of the device in response to the received signal, thereby waking up the ZigBee system from the state of being turned off.

However, such a system should operate two types of communication standards in such a way as to enable the ZigBee system and the RFID system to be installed in each of network communication modules. Accordingly, the construction of the system is complicated and requires high cost.

Further, since the network device needs a separate power, the network device generally uses an additional small-sized battery. An active type system which is used with a battery cannot be operated for a long time due to the limited capacity of the battery.

Furthermore, since such a method should operate two types of communication standards in such a way as to enable both the ZigBee and RFID systems to be installed in each of the network communication modules, the construction of the system is complicated. In addition, since an expensive RFID reader should be provided in the construction of the system, high cost is caused.

SUMMARY OF THE INVENTION

Accordingly, the present invention has been made keeping in mind the above problems occurring in the prior art, and the present invention is intended to provide an apparatus and method for low power local area communication using event signal control, which enables data transmission and reception without a delay while maintaining low-power characteristics when data is transmitted between a network coordinator and a network device.

Further, the present invention is intended to provide an apparatus and method for low power local area communication using event signal control, in which the network device can charge power using an event signal received from the network coordinator.

In accordance with an aspect of the present invention, there is provided an apparatus for low power local area communication using event signal control, comprising at least one network coordinator for transmitting a periodic beacon signal based on a preset beacon period of a superframe, and a continuous Radio Frequency (RF) event signal, receiving a first signal including a Service Set Identifier (SSID), and a second signal including both the SSID and an event detection code, and performing transmission and reception of data when authentication has been completed; and a plurality of network devices, each being configured such that the network device detects a structure of the superframe of the received beacon signal and then generates and transmits the first signal, and such that the network device is awakened by the received RF event signal, generates and transmits the second signal, performs transmission and reception of data when authentication has been completed, and is thereafter switched to power saving mode or OFF mode.

In an embodiment, wherein the network coordinator comprises a ZigBee communication unit for periodically transmitting the beacon signal according to the preset beacon period of the superframe, and receiving the first signal and the second signal; an RF signal generation unit for continuously transmitting the RF event signal; an application interface for interfacing with an application used in the network coordinator; and a Micro Controller Unit (MCU) for performing control such that the beacon signal and the RF event signal are transmitted, the first signal and the second signal are received, and authentication is performed by performing comparison and analysis on the SSID, with a result that transmission and reception of data is performed, and such that the application is operated in response to only the second signal including the event detection code.

In an embodiment, the RF signal generation unit is an oscillator.

In an embodiment, each of the network devices comprises a ZigBee communication unit for receiving the periodic beacon signal based on the preset beacon period of the superframe and the continuous RF event signal, and transmitting the first signal and the second signal; a power detection unit for detecting power of the received RF event signal, and converting the RF event signal into a wake-up signal; an application interface for interfacing with an application used in the network device; and an MCU configured such that the network device detects the structure of the superframe of the received beacon signal, generates and transmits the first signal, and then performs transmission and reception of data when authentication has been completed, and such that the network device is awakened by the RF event signal, generates and transmits the second signal by encoding the event detection code required to detect the RF event signal, performs transmission and reception of data when authentication has been completed, sets a wake-up time according to the beacon period of the superframe after the transmission and reception of data, and is thereafter switched to the power saving mode or OFF mode.

In an embodiment, the network device comprises a charging unit, the charging unit comprising a charging circuit for charging power detected by the power detection unit; and a battery for storing the power charged by the charging circuit.

In accordance with another aspect of the present invention, there is provided a method for low power local area communication using event signal control, comprising (A) a network coordinator transmitting a periodic beacon signal based on a preset beacon period of a superframe, and a continuous RF event signal, receiving a first signal including a Service Set Identifier (SSID) and a second signal including both the SSID and an event detection code, and performing transmission and reception of data when authentication has been completed; and (B) a network device detecting a structure of the superframe of the received beacon signal and then generating and transmitting the first signal, and the network device being awakened by the received RF event signal, generating and transmitting the second signal, performing transmission and reception of data when authentication has been completed, and being thereafter switched to power saving mode or OFF mode.

In an embodiment, (A) comprises (A-1) transmitting the periodic beacon signal based on the preset beacon period of the superframe and the continuous RF event signal; (A-2) receiving the first signal or the second signal, and performing authentication by performing comparison and analysis on the SSID; (A-3) when authentication has been completed, allocating a ZigBee communication channel, and transmitting and receiving data through the channel.

In an embodiment, (A) further comprises (A-4) determining whether the event detection code required to detect the RF event signal has been received.

In an embodiment, (B) comprises (B-1) detecting the structure of the superframe of the received beacon signal, and then generating and transmitting the first signal; (B-2) when authentication of the first signal has been completed, transmitting and receiving data through an allocated ZigBee channel; and (B-3) when the transmission and reception of the data has been completed, setting a wake-up time according to the beacon period of the superframe, and performing switching to the power saving mode or OFF mode.

In an embodiment, (B) further comprises (B-4), after (B-3), determining whether the RF event signal has been received;

(B-5) if it is determined that the RF event signal has been received, converting the RF event signal into a wake-up signal, encoding the event detection code required to detect the RF event signal, and then generating and transmitting the second signal; and (B-6) when authentication of the second signal has been completed, transmitting and receiving data through the allocated ZigBee channel, and performing switching to the power saving mode or OFF mode.

In an embodiment, (B) further comprises, after (B-4), (B-7) if it is determined that the RF event signal has been received, detecting power of the RF event signal and charging the power.

In an embodiment, (B) further comprises (B-8), after (B-3), determining whether the set wake-up time has been reached; and (B-9) if it is determined that the set wake-up time has been reached, releasing the power saving mode or OW mode, being awakened and receiving the beacon signal.

DESCRIPTION OF THE PREFERRED EMBODIMENTS

Figure 1:
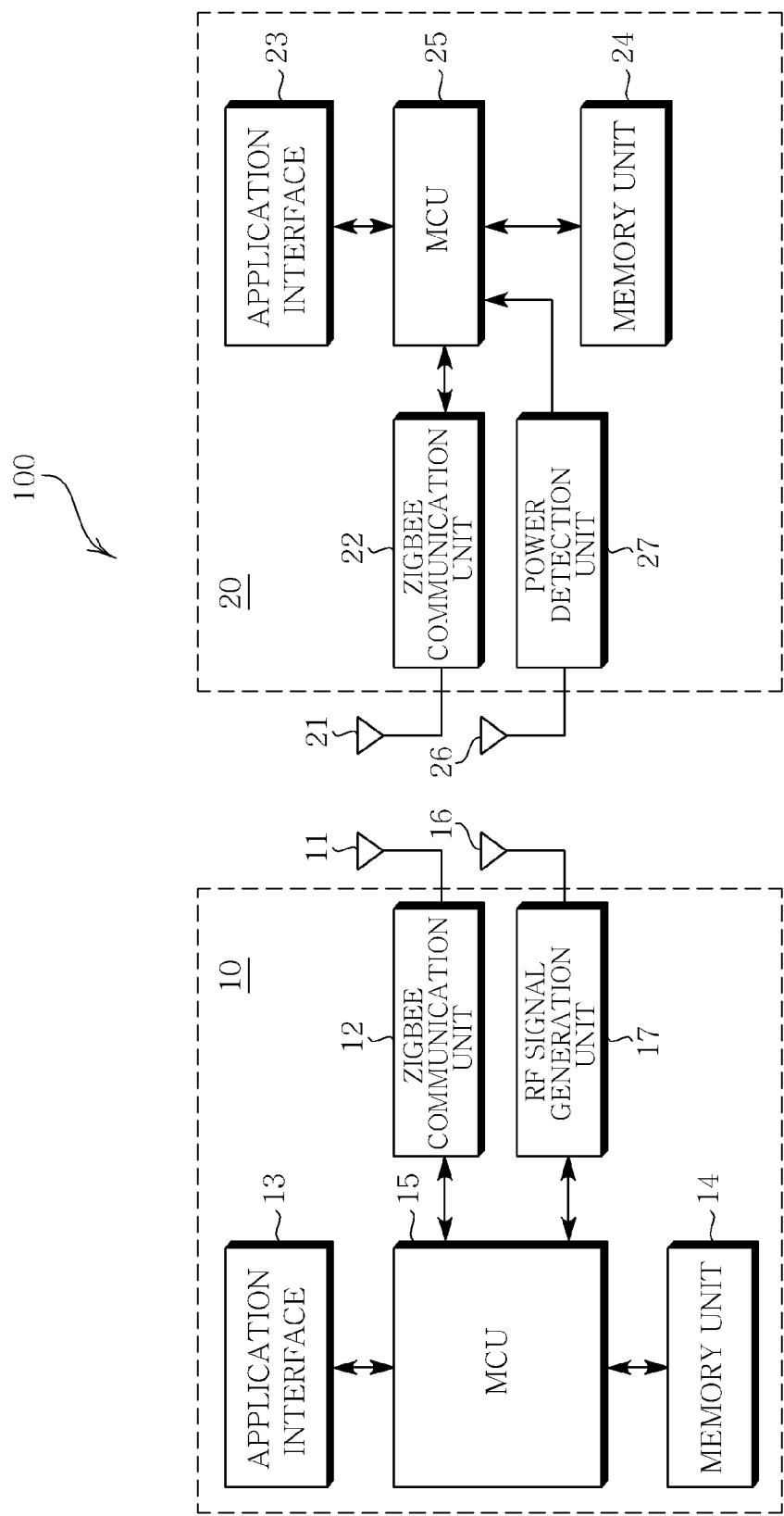
FIG. 1 is a block diagram of a low power local area communication apparatus using event signal control according to an embodiment of the present invention.

Prior to giving the description, the terms and words used in the present specification and claims should not be interpreted as being limited to their typical meaning based on the dictionary definitions thereof, but should be interpreted to have the meaning and concept relevant to the technical spirit of the present invention on the basis of the principle by which the inventor can suitably define the implications of terms in the way which best describes the invention.

The above and other objects, features and advantages of the present invention will be more clearly understood from the following detailed description taken in conjunction with the accompanying drawings. In the present specification, reference now should be made to the drawings, in which the same reference numerals are used throughout the different drawings to designate the same or similar components. Further, in the description of the present invention, if detailed descriptions of related well-known constructions or functions are determined to make the gist of the present invention unclear, the detailed descriptions will be omitted.

Hereinafter, embodiments of the present invention will be described in detail with reference to the accompanying drawings.

FIG. 1 is a block diagram of a low power local area communication apparatus using event signal control according to an embodiment of the present invention.

Referring to FIG. 1, the low power local area communication apparatus 100 using event signal control according to the embodiment includes a network coordinator 10 and a network device 20.

The network coordinator 10 includes a ZigBee communication terminal, having a ZigBee antenna 11, a ZigBee communication unit 12, an application interface 13, a memory unit 14 and a Micro Controller Unit (MCU) 15, and further includes an RF antenna 16 for transmitting an RF event signal and an RF signal generation unit 17.

The ZigBee communication unit 12 controls the transmission and reception of data in conformity with ZigBee protocols, and periodically transmits beacon signals through the ZigBee antenna 11 on the basis of the preset beacon period of a superframe. Here, the interval between the beacon signals may range from a minimum of 15 ms to a maximum of 245 ms. The structure of the superframe includes ZigBee channels, each having N time slots resulted from equally dividing the time between two beacon signals which are generated at a predetermined period. The ZigBee channels are randomly allocated through competition between a plurality of devices or allocated to specific devices, respectively.

Further, the ZigBee communication unit 12 receives a first signal including a Service Set Identifier (SSID) from the network device 20 which entered a ZigBee detection area, or a second signal including both the SSID and an event detection code encoded by an event signal, and then transmits the received signal to the MCU 15.

The SSID is a 32-byte length unique identifier attached to the respective headers of packets transmitted in a wireless manner, and is used as a code when the network device 20 accesses the network coordinator 10.

When the authentication of the SSID of the network device 20 is completed by the MUC 15, the network coordinator 10 allocates a ZigBee channel to the network device 20, so that data transmission and reception is performed.

The event detection code is a detection code encoded when the network device 20 receives an RF event signal, and a detection code which enables the network coordinator 10 to distinguish periodic data transmission and reception based on a beacon period from non-periodic data transmission and reception based on an RF event signal.

That is, if a signal transmitted through the ZigBee communication unit 12 is the first signal (including only an SSID), the network coordinator 10 considers a current operation to be data transmission and reception which periodically occurs based on the beacon period. Further, if the signal transmitted through the ZigBee communication unit 12 is the second signal (further including the event detection code as well as the SSID), the network coordinator 10 considers a current operation to be data transmission and reception which occurs based on the RF event signal.

The application interface 13 realizes an interface with an application in which the low power local area communication apparatus 100 using event signal control according to the present invention is used.

The memory unit 14 stores the SSIDs of a plurality of devices for ZigBee communication, event detection codes for RF communication, and the location information of a coordinator preset depending on a section.

Further, after ZigBee communication with the authenticated device 20 has been completed, the memory unit 14 may store information about the time of communication with the device 20 and the current location of the coordinator 10 with which the device 20 has communicated.

The RF signal generation unit 17 continuously transmits the RF event signal through the RF antenna 16. An oscillator which generates and transmits frequencies in a specific band is used as the RF signal generation unit 17.

The MCU 15 controls the overall operation of each component of the network coordinator 10 according to predetermined control flow.

In detail, the MCU 15 performs control such that the ZigBee communication unit 12 periodically transmits a beacon signal based on a set beacon period, and the RF signal generation unit 17 continuously transmits an RF event signal.

Further, the MCU 15 performs control such that the ZigBee communication unit 12 receives the first signal including the SSID from the device 20 which entered the ZigBee detection area, through the ZigBee antenna 11, and the second signal including both the SSID and the event detection code from the device 20 which entered an RF event signal detection area, and transmits the received signals to the MCU 15.

If the first signal is transmitted to the MCU 15 (first mode), the MCU 15 performs an authentication process by performing comparison and analysis on the SSID included in the first signal. If the device 20 is found to be a new device as the result of the authentication, the MCU 15 performs control such that the new device is registered by storing the SSID in the memory unit 14.

Thereafter, the MCU 15 allocates a ZigBee channel to the authenticated device, and performs control such that data transmission and reception is performed.

If the second signal is transmitted to the MCU 15 (second mode), the MCU 15 performs the above-described authentication process by performing comparison and analysis both on the SSID and on the event detection code which are included in the second signal, and performs control such that data transmission and reception, which non-periodically occur in response to the RF event signal based on the event detection code, is performed.

Meanwhile, in order to realize low-power characteristics, the network device 20 is operated in the state of being turned off for most of the time except for time required for synchronization with the network coordinator 10.

That is, in order to reduce power consumption, the network device 20 is periodically awakened by setting wake-up times according to the beacon period set in the network coordinator 10, or is non-periodically awakened in response to the RF event signal transmitted from the network coordinator 10.

The network device 20 includes a ZigBee communication terminal, having a ZigBee antenna 21, a ZigBee communication unit 22, an application interface 23, a memory unit 24 and an MCU 25, and further includes an RF antenna 26 for receiving an RF event signal and converting the received signal into a wake-up signal, and a power detection unit 28.

The ZigBee communication unit 22 controls data transmission and reception in conformity with a local area communication protocol. If the network device 20 enters the ZigBee detection area of the network coordinator 10, the ZigBee communication unit 22 transmits the first signal including the SSID of the device 20 to the network coordinator 10 to perform the data transmission and reception to and from the network coordinator 10. Further, if the network device 20 enters the RF event signal detection area of the network coordinator 10, the ZigBee communication unit 22 transmits the second signal including both the SSID of the device 20 and the encoded event detection code to the network coordinator 10 in response to the RF event signal received through the RF antenna 26.

Further, if authentication based on the SSID is completed, the ZigBee communication unit 22 transmits and receives data through the ZigBee communication channel allocated by the network coordinator 10.

The application interface 23 realizes an interface with an application in which the low power local area communication apparatus 100 using event signal control according to the present invention is used.

The memory unit 24 stores the SSID of the network device 20 for local area communication and an event detection code encoded for RF communication.

The power detection unit 27 receives the RF event signal continuously transmitted from the network coordinator 10 through the RF antenna 26, converts the received RF event signal into a wake-up signal, and then transmits the wake-up signal to the MCU 25.

When the wake-up signal is transmitted to the MCU 25, the network device 20 awakened in response to the wake-up signal is operated for local area data transmission and reception to and from the network coordinator 10.

The MCU 25 controls the overall operation of each component of the network device 20 according to predetermined control flow.

In detail, the MCU 25 performs control such that the ZigBee communication unit 22 is awakened at every wake-up time set according to the beacon period of the network coordinator 10, or is awakened in response to the wake-up signal based on the RF event signal continuously transmitted from the network coordinator 20.

Further, the MCU 25 performs control such that the ZigBee communication unit 22, awakened at every set wake-up time, receives a beacon signal periodically transmitted from the network coordinator 10 through the ZigBee antenna 21, and then transmits the received beacon signal to the MCU 25.

Further, the MCU 25 performs control such that the power detection unit 27 converts the RF event signal received through the RF antenna 26 into a wake-up signal, and then transmits the wake-up signal to the MCU 25.

If the beacon signal received through the ZigBee antenna 21 is transmitted to the MCU 25 (first mode), the MCU 25 performs control such that it generates a first signal including an SSID for ZigBee communication, stored in the memory unit 24, and transmits the first signal to the network coordinator 10 through the ZigBee communication unit 22.

If the RF event signal received through the RF antenna 26 is transmitted to the MCU 25 through the power detection unit 27 (second mode), the MCU 25 performs control such that it generates a second signal, including an SSID for ZigBee communication, stored in the memory unit 24, and an event detection code required to detect the RF event signal, and transmits the second signal to the network coordinator 10 through the ZigBee antenna 21.

As described above, the network device 20 can supply power to be used by the present device 20 by further including a charging unit 28 for charging power detected by the power detection unit 27 from the RF event signal.

Figure 2:
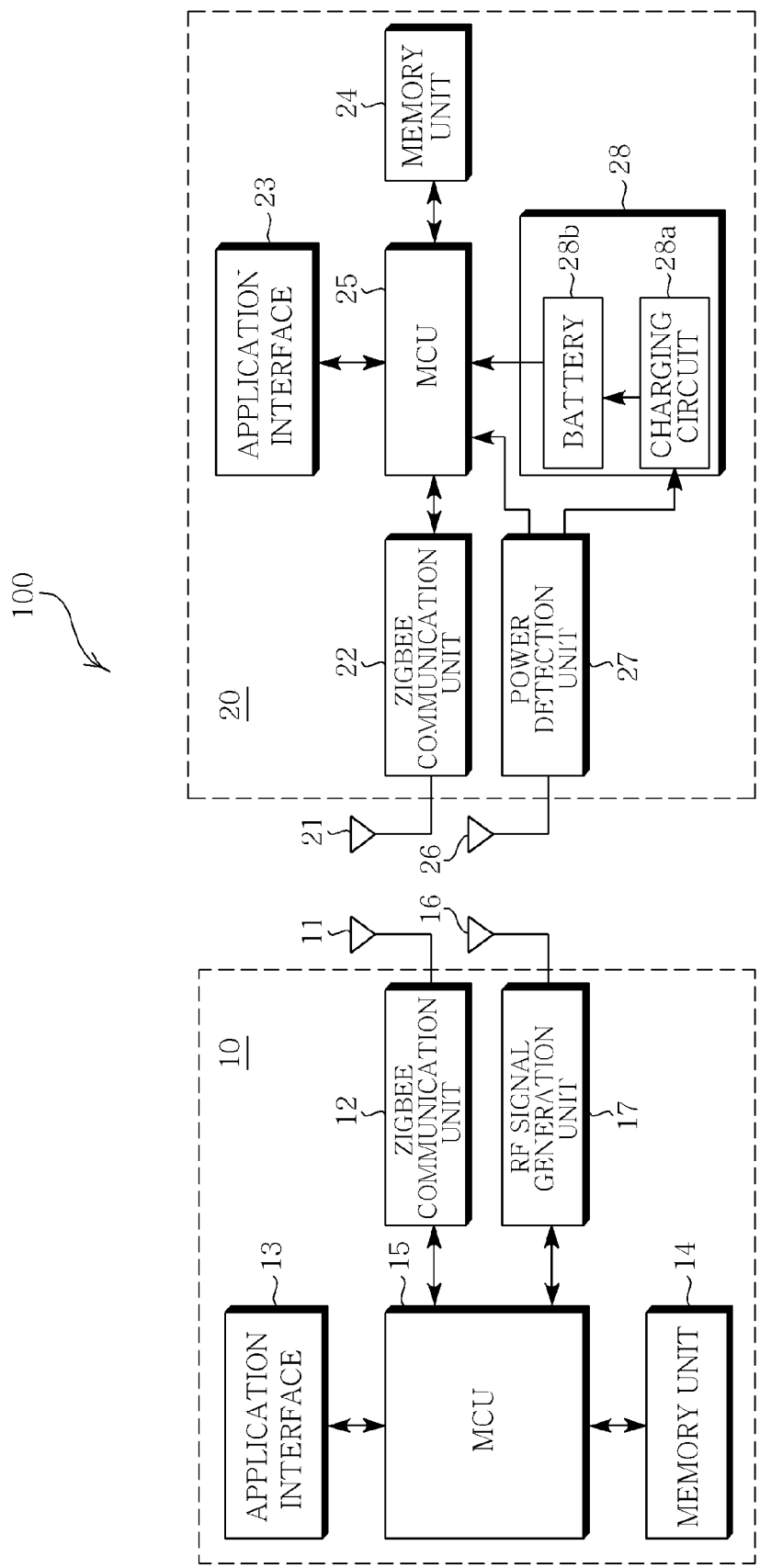
FIG. 2 is a block diagram of the low power local area communication apparatus using event signal control, in which the network device of FIG. 1 includes a charging unit.

FIG. 2 is a block diagram showing the low power local area communication apparatus using event signal control, in which a charging unit is provided in the network device of FIG. 1.

As shown in FIG. 2, the charging unit 28 of a network device 20 includes a charging circuit 28a and a battery 28b.

The charging unit 28 charges the power of an RF event signal detected by the power detection unit 27 using the charging circuit 28a, and stores the charged power in the battery 28b.

Figure 3:
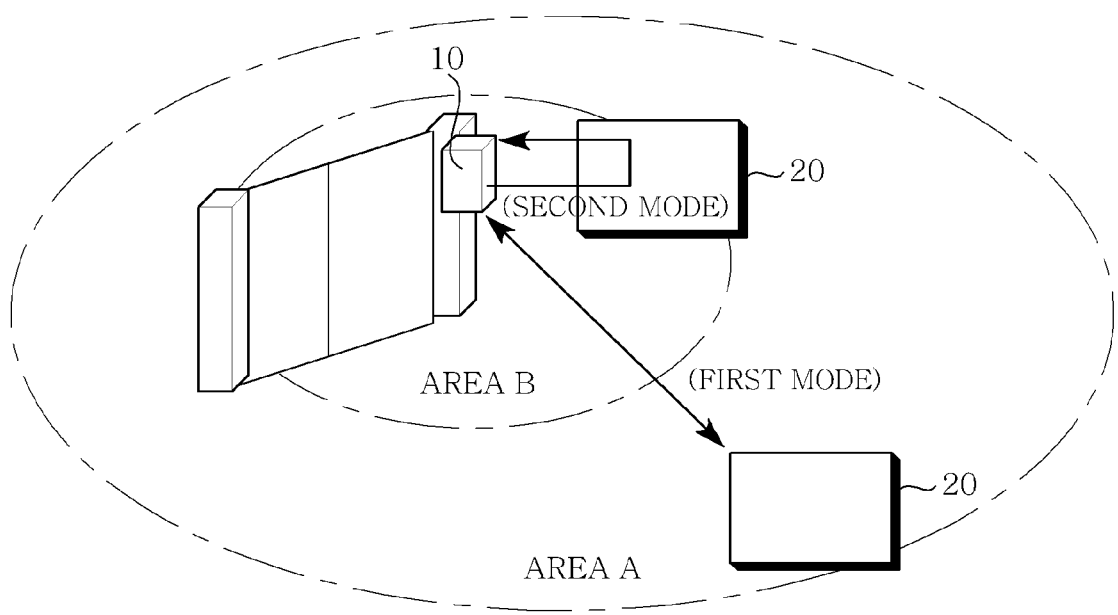
FIG. 3 is a diagram for explaining an example in which the low power local area communication apparatus using event signal control, shown in FIGS. 1 and 2, is used in a door control application.

FIG. 3 is a diagram showing an example in which the low power local area communication apparatus 100 using event signal control, shown in FIGS. 1 and 2, is used in a door control application.

Referring to FIG. 3, the low power local area communication apparatus 100 using event signal control according to an embodiment of the present invention is operated in two modes.

First mode is a data transmission and reception mode between the network coordinator 10 and the network device 20 using periodic ZigBee communication based on the beacon period of a superframe.

As shown in FIG. 3, when the network device 20 is located in a ZigBee signal detection area (area A), the periodic data transmission and reception occurs using ZigBee communication. Here, area A has a size of several meters (m).

That is, when a beacon signal is periodically transmitted from the network coordinator 10 on the basis of a preset beacon period, the network device 20 located at a several-meter range from the network coordinator 10 is awakened at the wake-up time set according to the beacon period, and then receives the beacon signal. Then, the network device 20 transmits a first signal, including its SSID, to the network coordinator 10, and then enables authentication to be performed. When the authentication of the network device 20 has succeeded, the network device 20 is allocated a ZigBee communication channel by the network coordinator 10, thus enabling periodic data transmission and reception to be performed between the network coordinator 10 and the network device 20.

In this case, data transmitted and received in the first mode includes the SSID of the authenticated device 20, the location of the coordinator 10 with which the network device 20 has communicated, and the time of ZigBee communication.

As described above, it is possible to detect the current location of the network device 20 which entered the ZigBee detection area of the network coordinator 10 according to the operation of the first mode, and to track the location of the network device 20 over time.

Second mode is a non-periodic data transmission and reception mode between the network coordinator 10 and the network device 20 based on RF communication.

As shown in FIG. 3, when the network device 20 enters the RF event signal detection area (area B), the non-periodic data transmission and reception occurs using RF communication. Here, the area B has a size of several centimeters (cm).

That is, when an RF event signal is continuously transmitted from the network coordinator 10, the network device 20 located at a several-centimeter (cm) range from the network coordinator 10 is awakened by the RF event signal. Accordingly, the network device 20 transmits a second signal, including its SSID and the event detection code encoded using the RF event signal, to the network coordinator 10, and then enables authentication to be performed. When the authentication of the network device 20 has succeeded, the network device 20 is allocated a ZigBee communication channel by the network coordinator 10, thus enabling non-periodic data transmission and reception to be performed between the network coordinator 10 and the network device 20. In this case, the door is controlled such that it opens and shuts through the application interface in response to only the second signal including the event detection code.

Here, the data transmitted and received in the second mode includes the SSID of the network device 20 and the event detection code encoded using the RF event signal.

As described above, the low power local area communication apparatus 100 using event signal control according to the present invention not only tracks the location of the device 20 over time and detects the current location thereof, but also enables the opening/shutting of the door, depending to the two types of operation modes.

Figure 4:
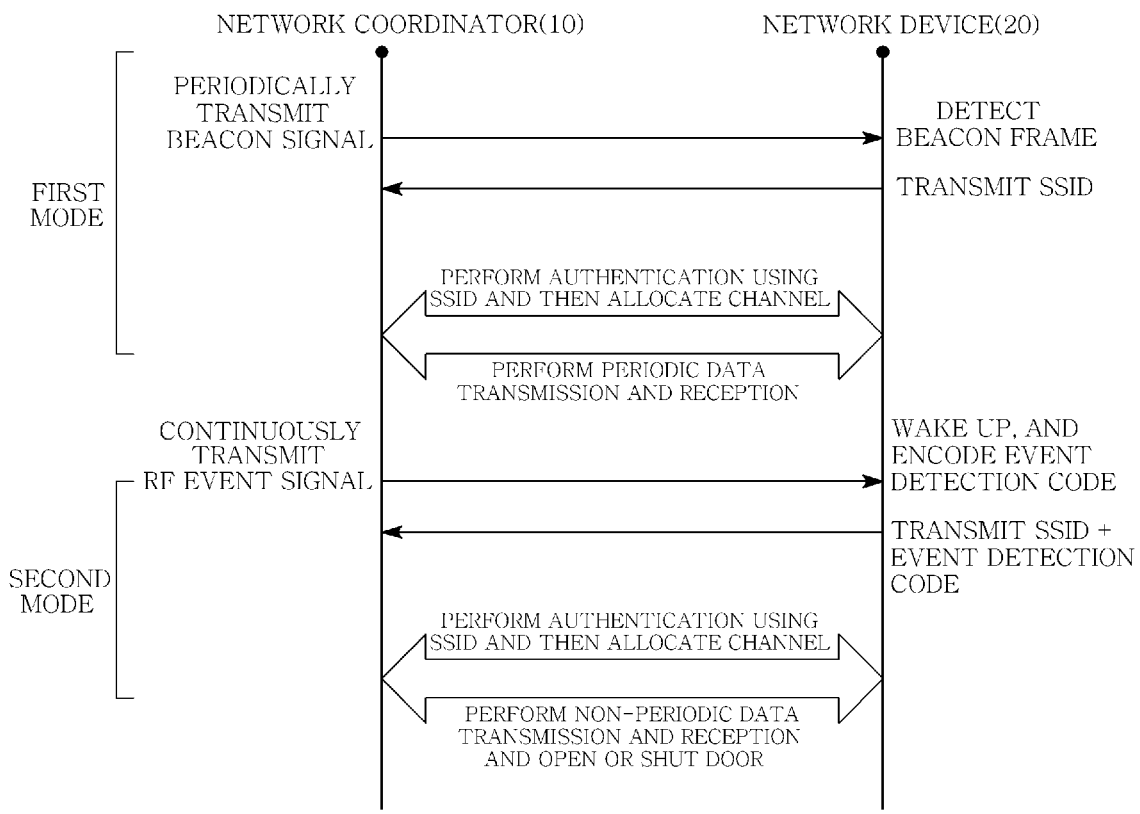
FIG. 4 is a flowchart for explaining a low power local area communication method using event signal control according to an embodiment of the present invention.

FIG. 4 is a flowchart showing a low power local area communication method using event signal control according to an embodiment of the present invention.

Referring to FIG. 4, when the network coordinator 10 periodically transmits a beacon signal on the basis of the beacon period of a superframe through the ZigBee communication unit 12, the network device 20, having received the beacon signal, transmits its SSID to the network coordinator 10.

The network coordinator 10 authenticates the network device 20 by performing analysis and comparison on the SSID, and allocates a ZigBee communication channel to the network device 20 when the authentication has succeeded, thus enabling data to be transmitted and received.

Further, when the network coordinator 10 continuously transmits an RF event signal through the RF signal generation unit 17, the network device 20, having received the RF event signal, transmits both its SSID and an encoded event detection code required to detect the RF event signal to the network coordinator 10.

The network coordinator 10 authenticates the network device 20 by performing comparison and analysis on the SSID, and allocates a ZigBee communication channel to the network device 20 when the authentication has succeeded, thus enabling data to be transmitted and received between the network coordinator 10 and the network device 20. Further, the network coordinator 10 controls an application such as the opening and shutting of a door, to which the low power local area communication apparatus 100 according to the present invention is applied, on the basis of the event detection code.

Figure 5:
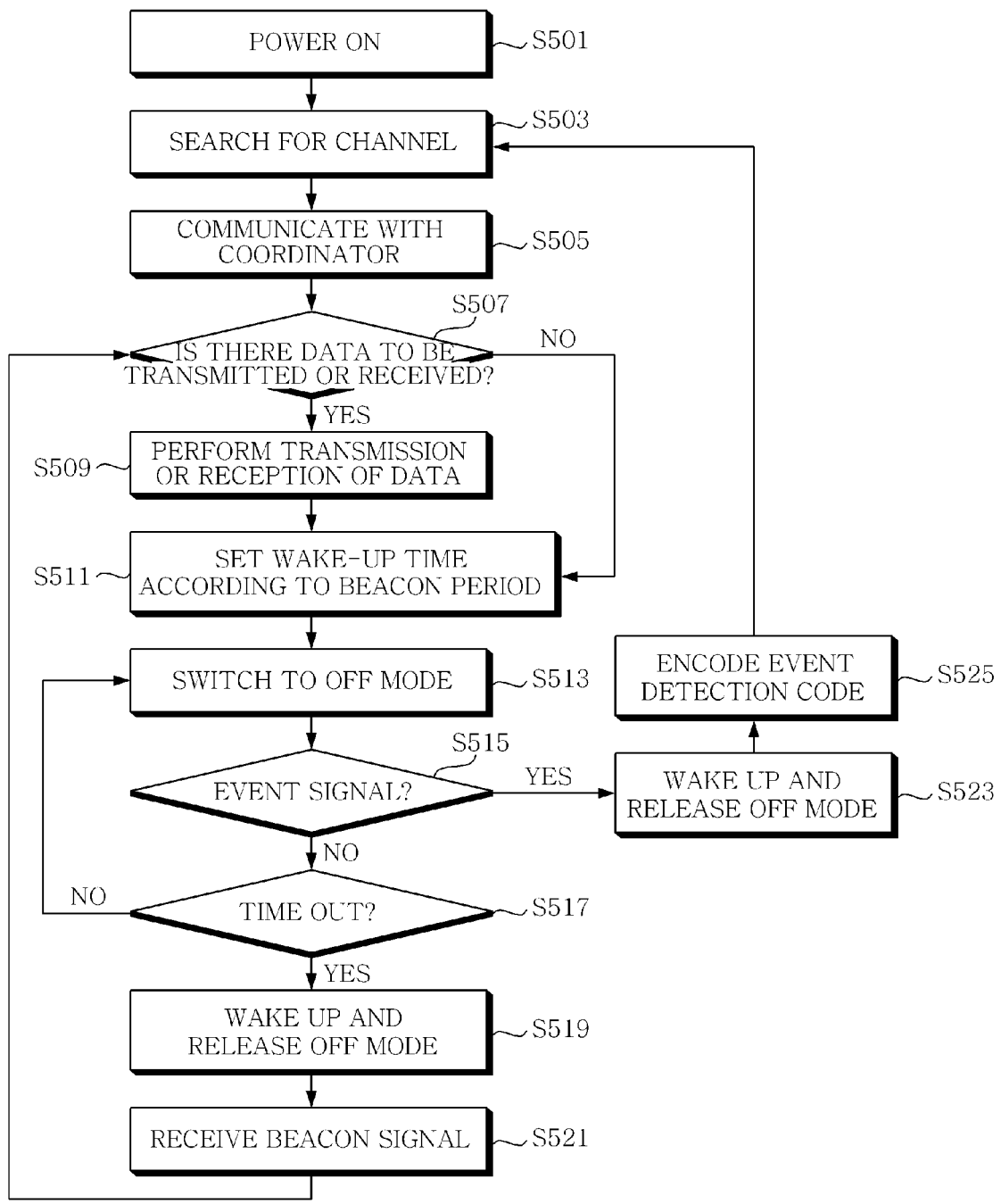
FIG. 5 is a flowchart for explaining the low power local area communication method using event signal control in a network device according to an embodiment of the present invention.

FIG. 5 is a flowchart showing a low power local area communication method using event signal control in a network device according to an embodiment of the present invention.

Referring to FIG. 5, when the power of the network device 20 is turned on, and the operation thereof is initiated (S501), the network device 20 searches for a channel, receives a beacon frame, and then detect channel information (including the SSID) and the structure of the superframe of the network in order to make a contact with the network coordinator 10 (S503). Further, after performing authentication by transmitting the SSID to the network coordinator 10, the network device 20 communicates with the network coordinator 10 using both the channel information and a set communication protocol on the basis of the detected superframe structure when the authentication has succeeded (S505).

Whether there is data to be transmitted or received to or from the network coordinator 10 is determined via the communication (S507). If it is determined that there is data to be transmitted or received, the transmission or reception of data is performed (S509).

When the transmission or reception of data has been completed, or if it is determined at S507 that there is no data to be transmitted or received, the wake-up time of the network device 20 is set according to the beacon period of the superframe (S511), and the current mode of the network device 20 is switched to power saving mode or OFF mode (S513), thus reducing the power consumption of the battery.

Further, whether an RF event signal has been received by the network device 20, switched to the power saving mode or OFF mode, is determined (S515).

If it is determined at S515 that an RF event signal has been received through the RF antenna 21, the network device 20 converts the RF event signal into a wake-up signal through the power detection unit 27, and transmits the wake-up signal to the MCU 25, so that the power saving mode or OW mode of the network device 20 is released, and then the network device is awakened (S525).

The network device 20 awakened by the RF event signal encodes an event detection code required to detect the RF event signal (S523), and thereafter repeats operations S503 to S513 so as to make a contact with the network coordinator 10. However, when S509 is performed, the event detection code encoded at S523 is further included in the transmitted and received data.

If it is determined at S515 that an RF event signal has not been received, whether the wake-up time set at S511 has been reached is determined (S517).

If it is determined at S517 that the set wake-up time has been reached, the network device 20 receives the beacon signal transmitted from the network coordinator 10 (S521), and repeats the above operation S507 of determining whether there is data to be transmitted or received.

If it is determined at S517 that the wake-up time has not been reached, the network device 20 is continuously kept in the power saving mode or OFF mode (S513).

Although not shown in detail in the drawing, the method of the present invention may include, after S523, detecting power from the received RF event signal, and charging the battery with the power.

According to an apparatus and method for low power local area communication using event signal control, when the local area communication apparatus is constructed, although an expensive RFID reader and an RFID tag are not provided, data transmission and reception is possible without a delay while maintaining low-power characteristics, so that there are advantages in that the construction of the system is simplified and the cost thereof is reduced.

Further, according to the present invention, a battery can be charged by the control of an event signal, so that there is an advantage in that the usage time of the battery can be increased.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for low power local area communication using event signal control, comprising:

at least one network coordinator for transmitting a periodic beacon signal based on a preset beacon period of a superframe, and a continuous Radio Frequency (RF) event signal, receiving a first signal including a Service Set Identifier (SSID), and a second signal including both the SSID and an event detection code, and performing transmission and reception of data when authentication has been completed; and a plurality of network devices, each being configured such that the network device detects a structure of the superframe of the received beacon signal and then generates and transmits the first signal, and such that the network device is awakened by the received RF event signal, generates and transmits the second signal, performs transmission and reception of data when authentication has been completed, and is thereafter switched to power saving mode or OFF mode;

a ZigBee communication unit for receiving the periodic beacon signal based on the preset beacon period of the superframe and the continuous RF event signal, and transmitting the first signal and the second signal;

a power detection unit for detecting power of the received RF event signal, and converting the RF event signal into a wake-up signal;

an application interface for interfacing with an application used in the network device; and a micro control unit (MCU) configured such that the network device detects the structure of the superframe of the received beacon signal, generates and transmits the first signal, and then performs transmission and reception of data when authentication has been completed, and such that the network device is awakened by the RF event signal, generates and transmits the second signal by encoding the event detection code required to detect the RF event signal, performs transmission and reception of data when authentication has been completed, sets a wake-up time according to the beacon period of the superframe after the transmission and reception of data, and is thereafter switched to the power saving mode or OFF mode.

2. The apparatus as set forth in claim 1, wherein the network coordinator comprises:

the ZigBee communication unit for periodically transmitting the beacon signal according to the preset beacon period of the superframe, and receiving the first signal and the second signal;

an RF signal generation unit for continuously transmitting the RF event signal;

an application interface for interfacing with an application used in the network coordinator; and the (MCU) further configured to perform control such that the beacon signal and the RF event signal are transmitted, the first signal and the second signal are received, and authentication is performed by performing comparison and analysis on the SSID, with a result that transmission and reception of data is performed, and such that the application is operated in response to only the second signal including the event detection code.

3. The apparatus as set forth in claim 2, wherein the RF signal generation unit is an oscillator.

4. The apparatus as set forth in claim 1, wherein the network device further comprises a charging unit, the charging unit comprising:

a charging circuit for charging power detected by the power detection unit; and a battery for storing the power charged by the charging circuit.

5. A method for low power local area communication using event signal control, comprising:

(A) a network coordinator transmitting a periodic beacon signal based on a preset beacon period of a superframe, and a continuous RF event signal, receiving a first signal including a Service Set Identifier (SSID) and a second signal including both the SSID and an event detection code, and performing transmission and reception of data when authentication has been completed; and (B) a network device detecting a structure of the superframe of the received beacon signal and then generating and transmitting the first signal, and the network device being awakened by the received RF event signal, generating and transmitting the second signal, performing transmission and reception of data when authentication has been completed, and being thereafter switched to power saving mode or OFF mode;

wherein (B) comprises:

(B-1) detecting the structure of the superframe of the received beacon signal, and then generating and transmitting the first signal, (B-2) when authentication of the first signal has been completed, transmitting and receiving data through an allocated ZigBee channel, (B-3) when the transmission and reception of the data has been completed, setting a wake-up time according to the beacon period of the superframe, and performing switching to the power saving mode or OFF mode, (B-4), after (B-3), determining whether the RF event signal has been received, (B-5) if it is determined that the RF event signal has been received, converting the RF event signal into a wake-up signal, encoding the event detection code required to detect the RF event signal, and then generating and transmitting the second signal, and (B-6) when authentication of the second signal has been completed, transmitting and receiving data through the allocated ZigBee channel, and performing switching to the power saving mode or OFF mode.

6. The method as set forth in claim 5, wherein (A) comprises:

(A-1) transmitting the periodic beacon signal based on the preset beacon period of the superframe and the continuous RF event signal;

(A-2) receiving the first signal or the second signal, and performing authentication by performing comparison and analysis on the SSID; and (A-3) when authentication has been completed, allocating a ZigBee communication channel, and transmitting and receiving data through the channel.

7. The method as set forth in claim 6, wherein (A) further comprises (A-4) determining whether the event detection code required to detect the RF event signal has been received.

8. The method as set forth in claim 5, wherein (B) further comprises, after (B-4), (B-7) if it is determined that the RF event signal has been received, detecting power of the RF event signal and charging the power.

9. The method as set forth in claim 5, wherein (B) further comprises:

(B-8), after (B-3), determining whether the set wake-up time has been reached; and (B-9) if it is determined that the set wake-up time has been reached, releasing the power saving mode or OFF mode, being awakened and receiving the beacon signal.

* * * * *